(12) United States Patent
Takamoto et al.

(10) Patent No.: US 7,798,929 B2
(45) Date of Patent: Sep. 21, 2010

(54) METHOD AND APPARATUS FOR CONTROLLING A BICYCLE TRANSMISSION TO COMPENSATE FOR POWER SUPPLY CHARACTERISTICS

(75) Inventors: Ryuichiro Takamoto, Sakai (JP); Masahiko Fukuda, Amagasaki (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 1352 days.

(21) Appl. No.: 10/904,956

(22) Filed: Dec. 7, 2004

(65) Prior Publication Data

US 2006/0122015 A1    Jun. 8, 2006

(51) Int. Cl.
*F16H 9/00*       (2006.01)
*F16H 57/04*      (2010.01)

(52) U.S. Cl. .......................................... 474/80; 474/82
(58) Field of Classification Search .............. 340/425.5, 340/432, 438, 456; 474/70, 110
See application file for complete search history.

(56) References Cited

U.S. PATENT DOCUMENTS

| | | | | |
|---|---|---|---|---|
| 5,213,548 A | * | 5/1993 | Colbert et al. | 474/71 |
| 5,261,858 A | * | 11/1993 | Browning | 474/69 |
| 5,357,177 A | | 10/1994 | Fey et al. | |
| 5,483,137 A | * | 1/1996 | Fey et al. | 318/560 |
| 6,162,140 A | | 12/2000 | Fukuda | |
| 6,166,649 A | * | 12/2000 | Inoue | 340/660 |
| 6,726,586 B2 | | 4/2004 | Fukuda | |
| 6,740,003 B2 | | 5/2004 | Fukuda | |
| 2004/0110585 A1 | | 6/2004 | Guderzo et al. | |

FOREIGN PATENT DOCUMENTS

| | | |
|---|---|---|
| EP | 0566024 A1 | 10/1993 |
| EP | 0697332 A1 | 2/1996 |
| EP | 1310423 A2 | 5/2003 |
| EP | 1359088 A2 | 11/2003 |
| EP | 1394036 A2 | 3/2004 |
| EP | 1422135 A2 | 5/2004 |
| EP | 1426284 A1 | 6/2004 |
| JP | 10-291491 A | 11/1998 |

OTHER PUBLICATIONS

European search report for EP 05024590, the European application that corresponds to this application, dated Oct. 9, 2006.

* cited by examiner

*Primary Examiner*—Khoi Tran
*Assistant Examiner*—Bhavesh V Amin
(74) *Attorney, Agent, or Firm*—James A. Deland

(57) ABSTRACT

An apparatus for controlling a movable bicycle device comprises a power supply sensor that detects an abnormal power supply characteristic, and a control unit operatively coupled to the power supply sensor. The control unit provides a first signal to command the bicycle device to move in a first manner when the power supply has a first characteristic, and the control unit provides a second signal to command the bicycle device to move in a different second manner when the power supply has a second characteristic.

23 Claims, 5 Drawing Sheets

METHOD AND APPARATUS FOR CONTROLLING A BICYCLE TRANSMISSION TO COMPENSATE FOR POWER SUPPLY CHARACTERISTICS

BACKGROUND OF THE INVENTION

The present invention is directed to bicycles and, more particularly, to a method and apparatus for controlling the operation of a bicycle transmission to compensate for power supply characteristics.

Bicycle transmissions that are operated by an electric motor or the like have recently become known. Such transmissions may be shifted automatically according to the bicycle speed or shifted manually by the rider. Typically, a shift command is generated according to the bicycle speed or manual input by the rider, the motor is controlled by a transmission operating unit in response to the shift command, and the gear ratio of the transmission is set accordingly.

For example, U.S. Pat. No. 6,162,140 discloses a motor driven derailleur that includes a base member, a movable member, and a linkage mechanism. The linkage mechanism includes a link member coupled to the base member and to the movable member so that the movable member moves relative to the base member. The link member is pivotally coupled to one of the base member and the movable member through a link coupling member, and a motor is provided for rotating the link-coupling member. The movable member moves relative to the base member in response to rotation of the link-coupling member.

U.S. Pat. No. 5,357,177 discloses an electrical adjustment device for an electrical chain transfer device for bicycles. The adjustment device comprises an adjusting element, a drive device for moving the adjusting element, and a control unit for controlling the drive device. A presetting device is operatively coupled to the control unit for storing a plurality of set values, wherein each set value corresponds to an operational position of the adjusting element and therefore the chain transfer device. The adjusting element can be moved to a desired set position, and then the set position value can be stored in the presetting device to replace a former set position value and thereby establish or fine tune an operating position of the chain transfer device.

U.S. Pat. No. 6,740,003 discloses an apparatus for moving an electrically controlled bicycle derailleur from a first sprocket to a second sprocket. The apparatus comprises a derailleur position input for receiving a signal from a potentiometer mounted to the derailleur that indicates a position of the derailleur, a memory for storing a reference derailleur position for the second sprocket, and a motion control circuit that provides a plurality of signals to move the derailleur from the first sprocket to the second sprocket. The plurality of signals comprises a first signal generated when the derailleur initially moves away from the first sprocket and a second signal generated when the derailleur is in close proximity to the second sprocket. The second signal prevents the derailleur from overshooting the second sprocket.

In such known systems, the speed of the motor that operates the various positioning elements depends on various characteristics of the power supply, such as voltage. For example, if the power supply voltage is higher than the designed operating voltage for the motor, possibly caused by high ambient temperature or high charging voltage from a wheel generator, then the motor shaft used to operate a derailleur may rotate faster than expected. If the sampling rate for the position sensor is not sufficiently high, then the derailleur may overshoot the destination sprocket and may even cause the chain to engage the sprocket beyond the destination sprocket. Thus, properly controlling the motor can become very difficult, including attempts to move the derailleur back to the proper position.

SUMMARY OF THE INVENTION

The present invention is directed to various features of an apparatus for controlling a movable bicycle device. In one embodiment, an apparatus for controlling a movable bicycle device comprises a power supply sensor that detects an abnormal power supply characteristic, and a control unit operatively coupled to the power supply sensor. The control unit provides a first signal to command the bicycle device to move in a first manner when the power supply has a first characteristic, and the control unit provides a second signal to command the bicycle device to move in a different second manner when the power supply has a second characteristic. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
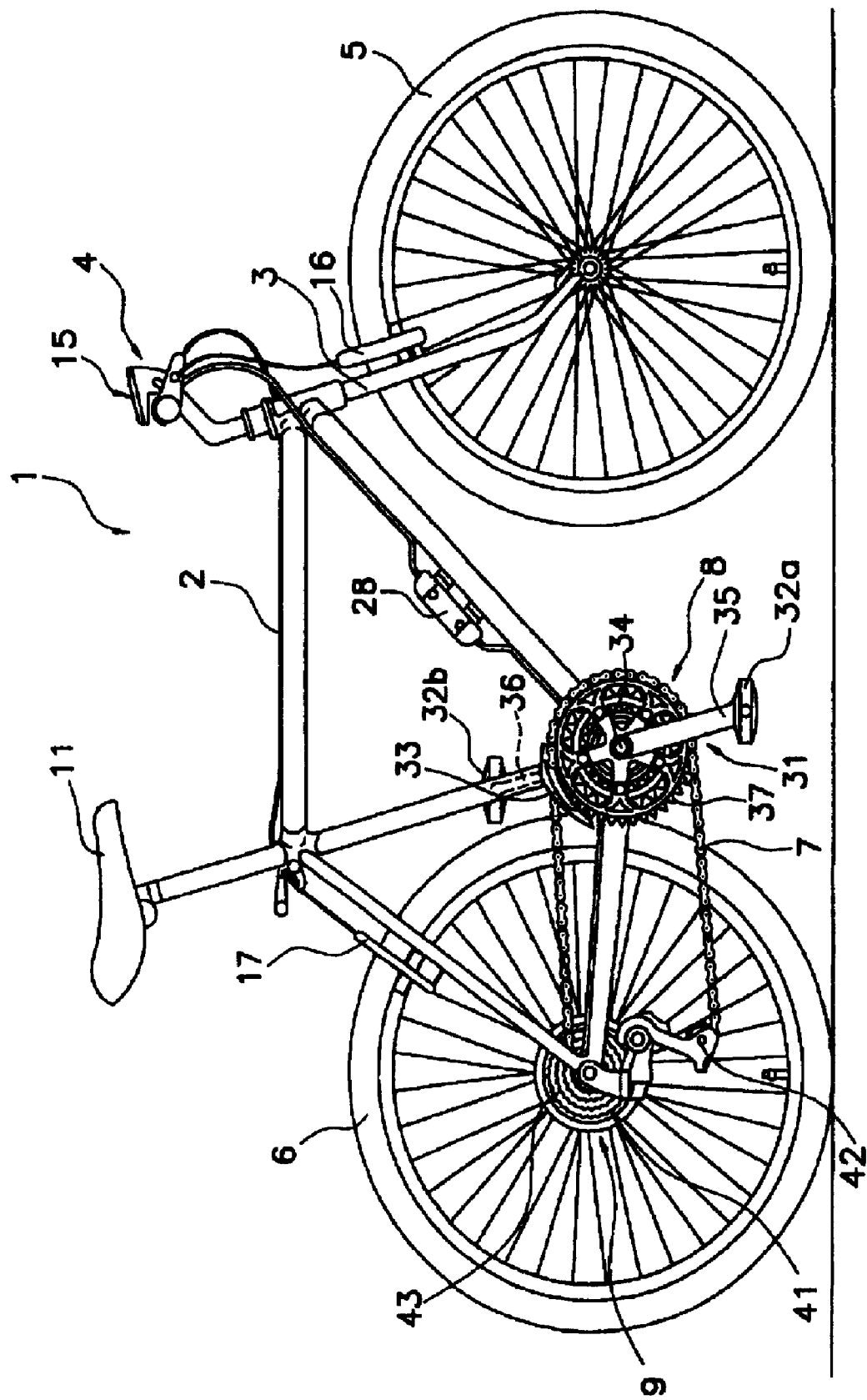
FIG. 1 is a side view of a bicycle that includes a particular embodiment of an electrically controlled bicycle transmission.
Figure 2:
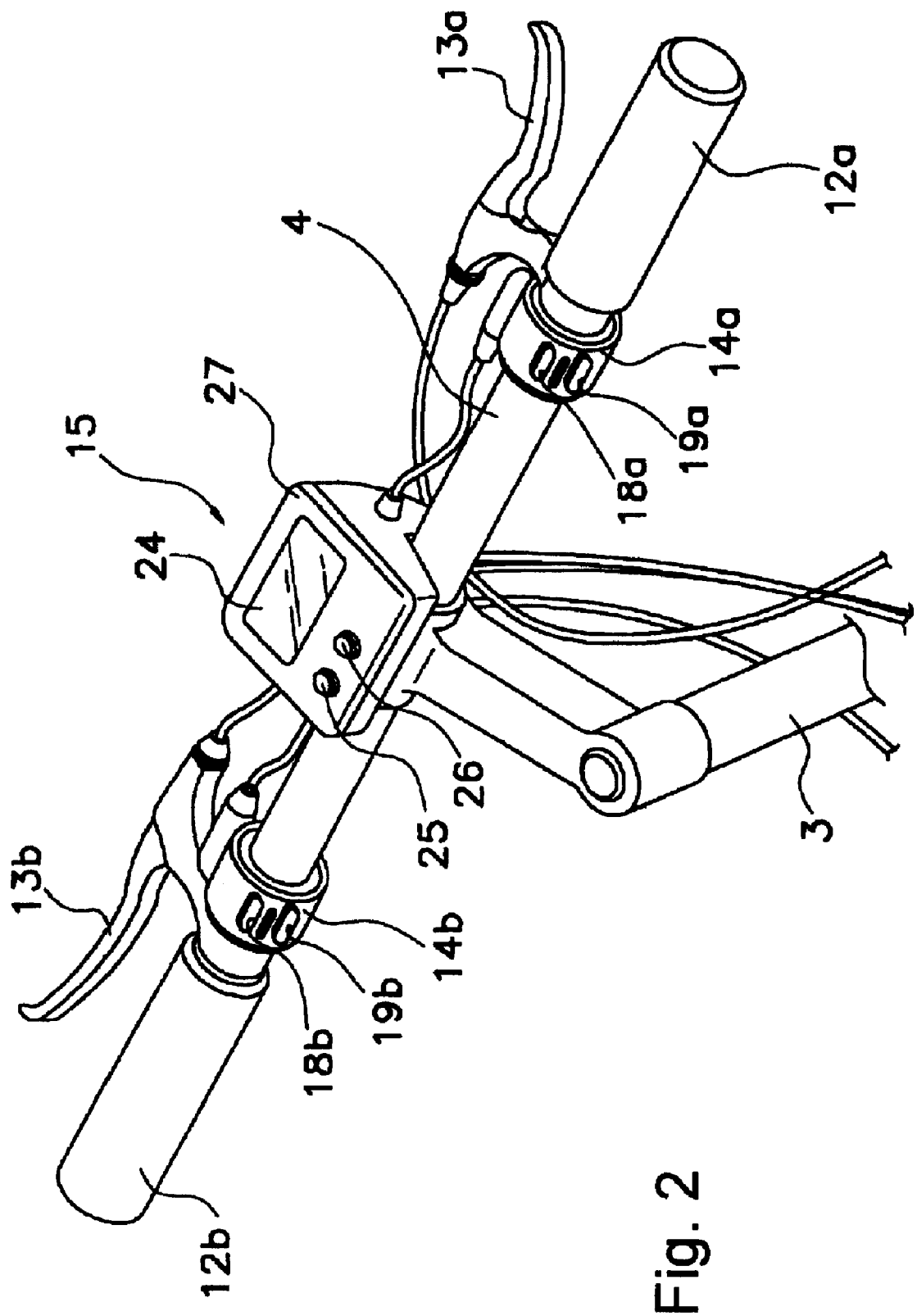
FIG. 2 is a detailed view of particular embodiments of handlebar mounted components of the bicycle shown in FIG. 1.

FIG. 1 is a side view of a bicycle 1 that includes a particular embodiment of an electrically controlled bicycle transmission. In this embodiment, bicycle 1 is a sport mountain bicycle, and it comprises a frame 2, a front fork 3 rotatably mounted to frame 2, a handlebar 4 mounted to the upper part of fork 3, a front wheel 5 rotatably attached to the lower part of fork 3, a rear wheel 6 rotatably attached to the rear of frame 2, a chain 7, a front transmission 8, a rear transmission 9, and a saddle 11. A front wheel brake 16 is provided for braking front wheel 5, and a rear wheel brake 17 is provided for braking rear wheel 6. As shown in FIG. 2, respective grips 12a, 12b and brake levers 13a, 13b are provided on both ends of handlebar 4. Brake lever 13b is connected to front wheel brake 16 for braking front wheel 5, and brake lever 13a is connected to rear wheel brake 17 for braking rear wheel 6.

Front transmission 8 is a mechanical unit attached in the central lower part of frame 2 for transmitting the drive force generated by the rider to rear transmission 9 via chain 7. Front transmission 8 comprises three sprockets 37 of various sizes and a front derailleur 33. The three sprockets 37 are installed on a gear crank 31 that is rotated when the rider pushes pedals 32a and 32b. Gear crank 31 comprises a crankshaft 34 that passes horizontally and rotatably through the central lower part of frame 2, a right crank 35, and a left crank 36. One end of the right crank 35 is connected to the right side of crankshaft 34, and the three sprockets 37 are attached to right crank 35. One end of the left crank 36 is connected to the left side of crankshaft 34. The other ends of right crank 35 and left crank 36 rotatably support pedals 32a and 32b, respectively. Front derailleur 33 engages chain 7 with one of the three sprockets 37 and is moved by an integrated front derailleur motor unit 50 (FIG. 3) that is controlled by a transmission control unit 15 mounted to handlebar 4. An integrated front derailleur position sensor 52 detects the position of front derailleur 33, and hence the current sprocket 37 engaged by chain 7.

Rear transmission 9 serves to transmit the driving force transmitted by chain 7 to rear wheel 6. Rear transmission 9 comprises a rear sprocket cluster 41 and a rear derailleur 42. In this embodiment, rear sprocket cluster 41 comprises seven sprockets 43 of different sizes that are mounted concentrically with the hub portion of rear wheel 6. Rear derailleur 42 engages chain 7 with one of the seven sprockets 43 and is moved by an integrated rear derailleur motor unit 54 (FIG. 3) that is controlled by transmission control unit 15. An integrated rear derailleur position sensor 56 detects the position of rear derailleur 42, and hence the current sprocket 43 engaged by chain 7.

As shown in FIG. 2, shift command units 14a, 14b are provided inwardly of grips 12a, 12b and brake levers 13a, 13b, respectively. Transmission control unit 15 is attached to the central portion of handlebar 4, and it is connected to shift command units 14a, 14b. Shift command units 14a, 14b are used for manually shifting front transmission 8 and rear transmission 9. A rear upshift button 18a and a rear downshift button 19a are provided in shift command unit 14a, and a front upshift button 18b and a front downshift button 19b are provided in shift command unit 14b. In this embodiment, upshift buttons 18a and 18b provide signals for upshifting front transmission 8 and rear transmission 9 by one sprocket. Similarly, downshift buttons 19a and 19b provide signals for downshifting front transmission 8 and rear transmission 9 by one sprocket.

Figure 3:
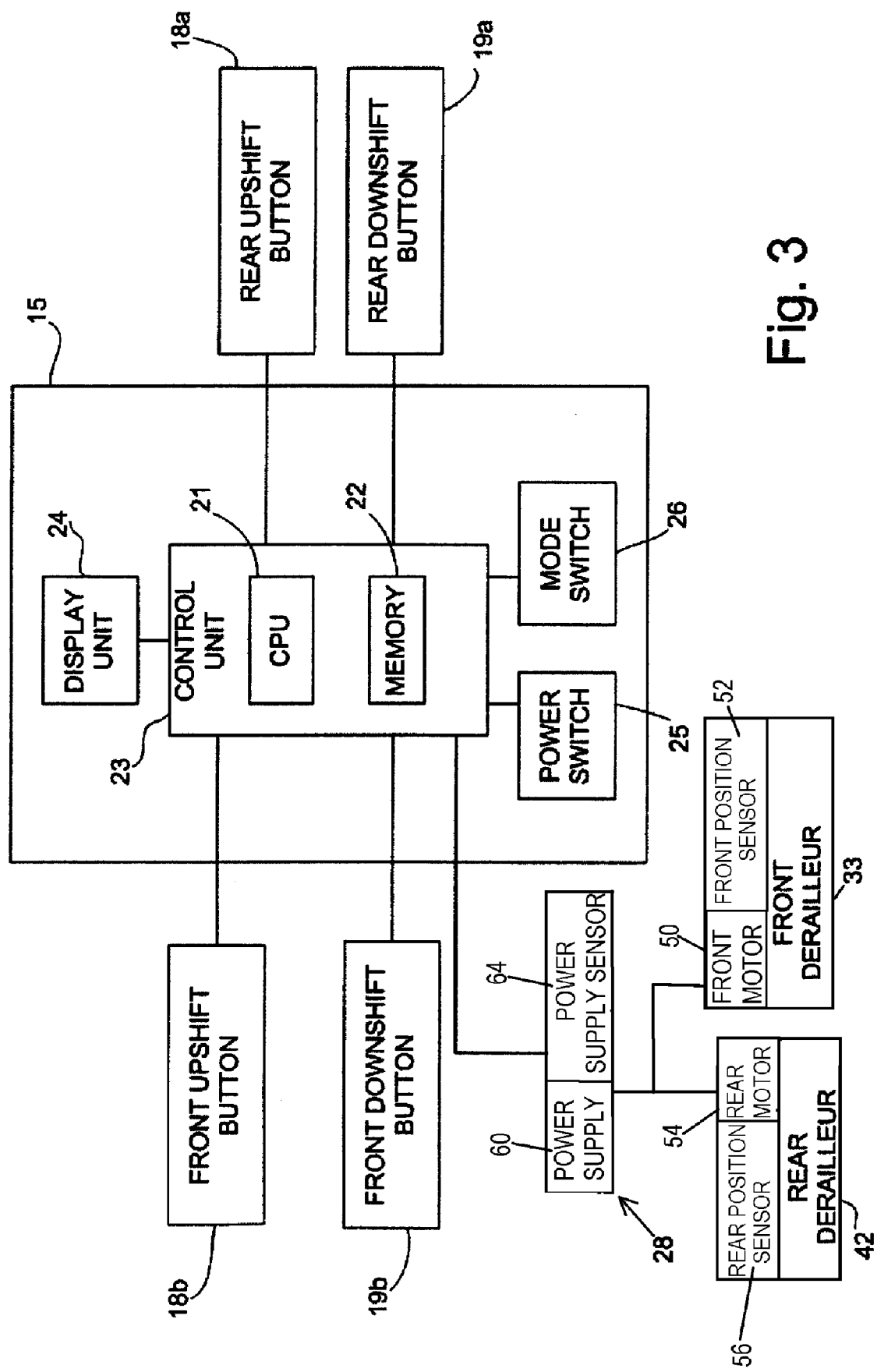
FIG. 3 is a block diagram of a particular embodiment of an overall transmission control unit.

As shown in FIGS. 1 and 3, transmission control unit 15 is connected to front transmission 8 and to rear transmission 9 through a drive unit 28. As shown in FIG. 3, drive unit 28 houses a power supply 60 and a power supply sensor 64. Power supply 60 provides operating power to front derailleur motor unit 50, rear derailleur motor unit 54 and/or transmission control unit 15; and power supply sensor 64 senses a characteristic of power supply 60. In this embodiment, power supply sensor 64 comprises a voltage sensor that senses a voltage of power supply 60.

Transmission control unit 15 comprises a control unit 23 having a CPU 21 and a memory 22, a display unit 24 for displaying travel information, a power switch 25, and a mode switch 26 that changes an operating mode of transmission control unit 15. CPU 21 is primarily responsible for controlling front transmission 8 and rear transmission 9 in response to signals provided by shift command units 14a and 14b, front derailleur position sensor 52, rear derailleur position sensor 56, power supply sensor 64, and data stored in memory 22. CPU 21 also controls the information presented on display unit 24. As shown in FIG. 2, transmission control unit 15 includes a box-like housing 27. Display unit 24, power switch 25 and mode switch 26 are arranged on the upper surface of housing 27.

Figure 4:
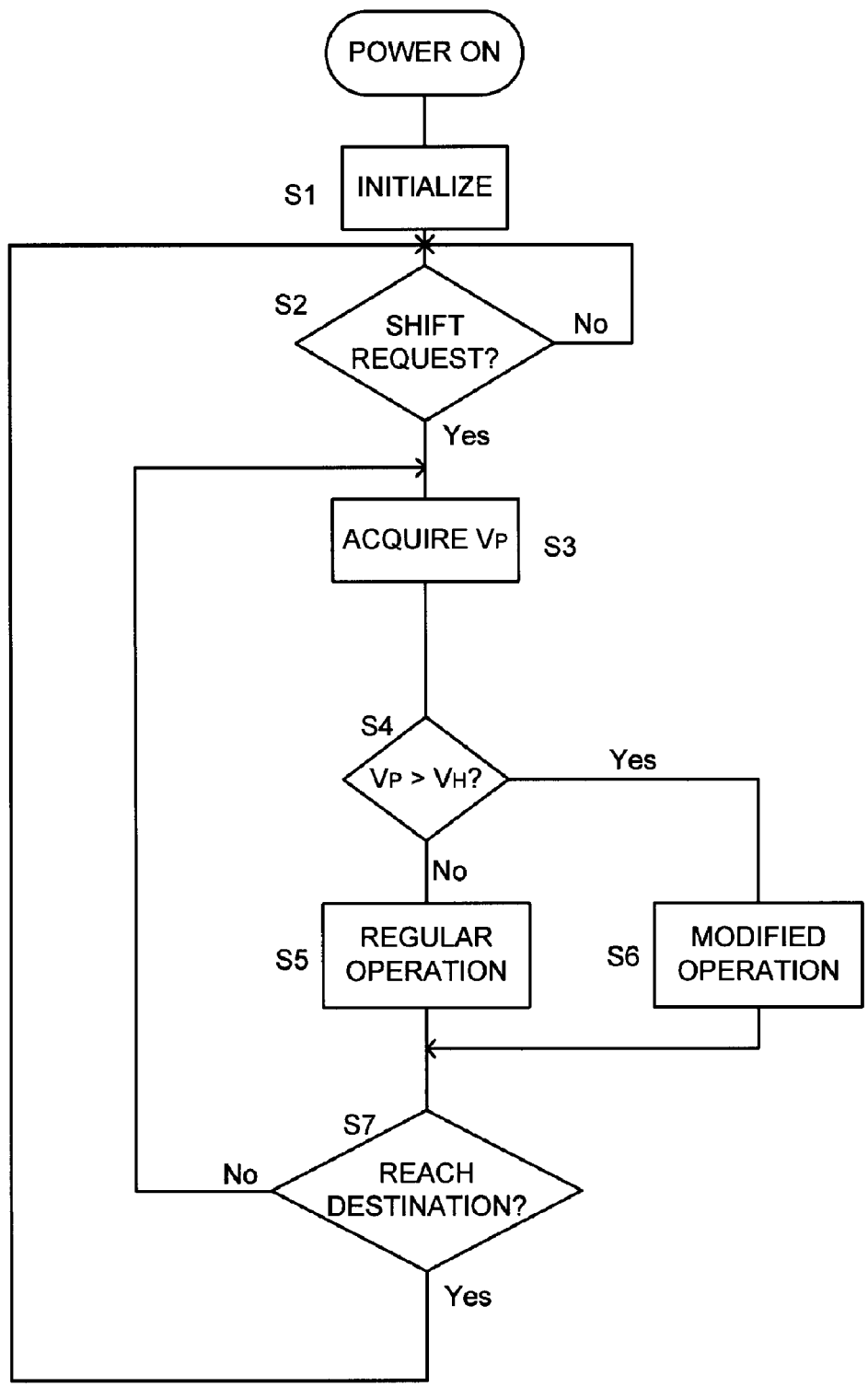
FIG. 4 is a flow chart of a particular embodiment of an algorithm used to control the bicycle transmission.

FIG. 4 is a flow chart of a particular embodiment of an algorithm used to control either front transmission 8 or rear transmission 9 in a manner that compensates for a characteristic (e.g., voltage) of power supply 60. The algorithm is invoked when the rider turns on the power switch 25 of transmission control unit 15.

Initial setting of transmission control unit 15 is conducted in a Step S1. The initial setting typically includes resetting of flags and counters and other processing to prepare the system for proper operation. It is then determined in a Step S2 whether or not a shift request has been received from one of shift command unit 14a or shift command unit 14b. If not, then processing simply returns to step S2. Otherwise, a current voltage $V_P$ of power supply 60 is acquired from power supply sensor 64 in a step S3. It is then determined in a step S4 whether or not the voltage $V_P$ is above a predetermined voltage $V_H$ stored in memory 22. In this embodiment, the voltage $V_H$ is the normal operating voltage of the corresponding front derailleur motor 50 or rear derailleur motor 54. A voltage greater than $V_H$ indicates an abnormal power supply characteristic. If the power supply voltage $V_P$ is not above the voltage $V_H$, then a signal for the regular operation of front derailleur motor unit 50 or rear derailleur motor unit 54 is provided by control unit 23. For example, if control unit 23 operates front derailleur motor unit 50 or rear derailleur motor unit 54 directly, then the signal output by control unit 23 may provide an analog voltage sufficient to operate motor unit 54 in a normal manner. If front derailleur motor unit 50 or rear derailleur motor unit 54 includes its own control processor, then the signal provided by control unit 23 may be a multibit digital signal as shown in Table 1.

TABLE 1

| Function | Bit 1 | Bit 2 |
| --- | --- | --- |
| Rotate Clockwise | 0 | 1 |
| Rotate Counterclockwise | 1 | 0 |
| Brake | 1 | 1 |
| Stay | 0 | 0 |

On the other hand, if it is determined in step S4 that the power supply voltage $V_P$ is greater than the voltage $V_H$, then an abnormal power supply characteristic has been detected, processing moves to step S6, and a modified operation of front derailleur motor unit 50 or rear derailleur motor unit 54 is performed. In this embodiment, front derailleur motor unit 50 or rear derailleur motor unit 54 is operated in an intermittent manner. For example, if control unit 23 operates front derailleur motor unit 50 or rear derailleur motor unit 54 directly, then the signal output by control unit 23 may provide an intermittent (e.g., pulsed or square wave) analog voltage sufficient to operate front derailleur motor unit 54 in a stepped manner. If front derailleur motor unit 50 or rear derailleur motor unit 54 includes its own control processor, then the signal provided by control unit 23 may be alternating multibit digital signals selected from Table 1. For example, control unit 23 may provide a clockwise rotation signal followed by a stay signal, then followed by a clockwise rotation signal, then followed by a stay signal, and so on. In either case, the derailleur will move a shorter distance for a given time interval when operating in Step S6 than when operating in Step S5. This ensures that a slow sampling rate of front derailleur position sensor 52 or rear derailleur position sensor 56 (relative to the processing speed of control unit 23) will not allow the corresponding front derailleur motor unit 50 or rear derailleur motor unit 54 to move front derailleur 33 or rear derailleur 42 beyond the destination sprocket.

In any event, it is then determined in a Step S7 whether or not the front derailleur position sensor 52 or rear derailleur position sensor 56 indicates that the corresponding front derailleur 33 or rear derailleur 42 has reached the desired destination sprocket. If so, then processing returns to Step S2. Otherwise, processing returns to Step S3.

Figure 5:
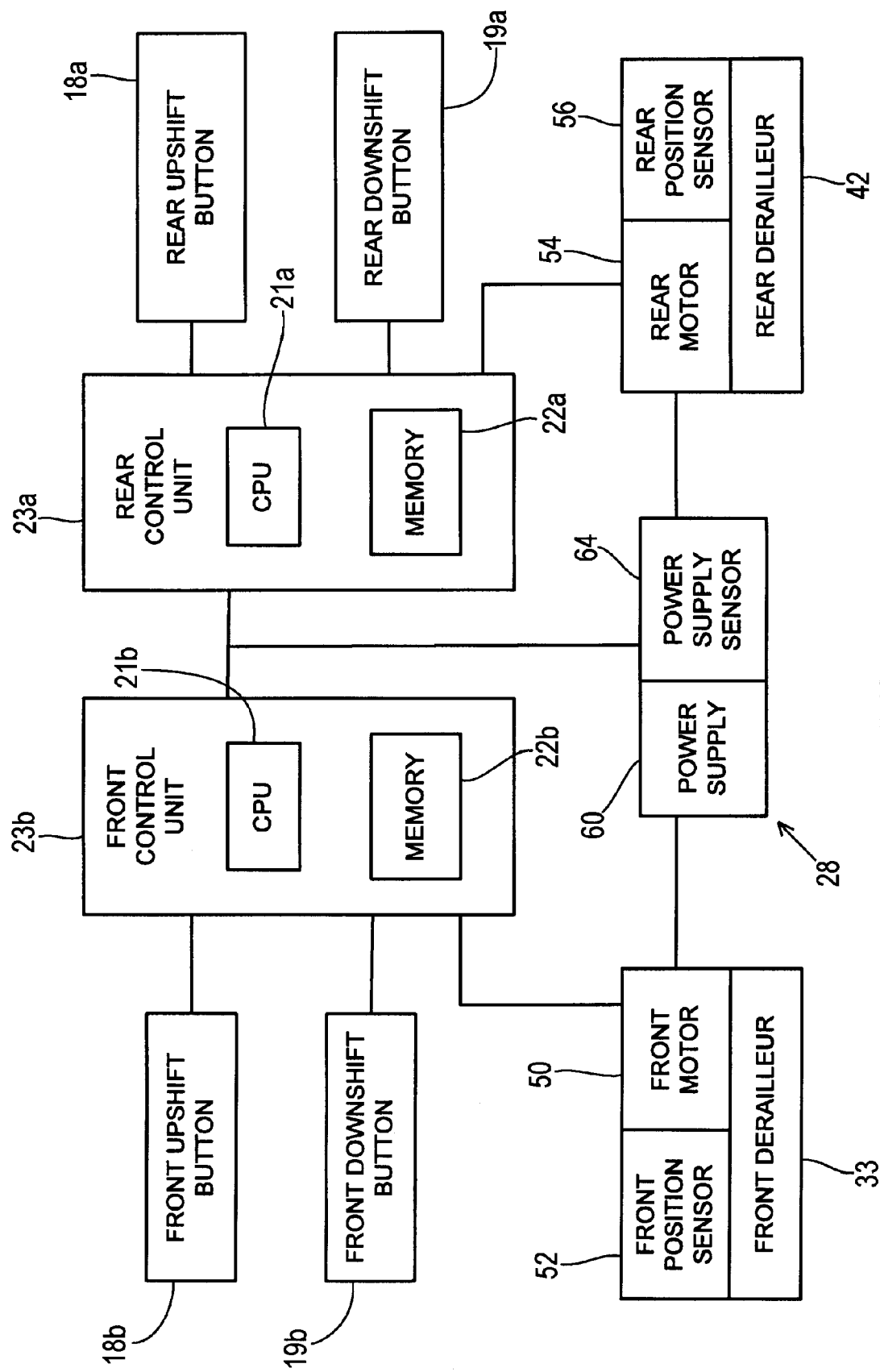
FIG. 5 is a block diagram of another embodiment of an overall transmission control unit.

While the above is a description of various embodiments of inventive features, further modifications may be employed without departing from the spirit and scope of the present invention. For example, FIG. 5 is a block diagram of another embodiment of an overall transmission control unit that employs the concept of distributed processing. In this embodiment, a rear derailleur control unit 23a having a CPU 21a and a memory 22a is connected to rear upshift button 18a and rear downshift button 19a for controlling rear derailleur 42 using rear derailleur motor unit 54 and rear derailleur position sensor 56. A separate front derailleur control unit 23b having a CPU 21b and a memory 22b is connected to front upshift button 18b and front downshift button 19b for controlling front derailleur 33 using front derailleur motor unit 50 and front derailleur position sensor 52. The operation of rear derailleur control unit 23a and/or front derailleur control unit 23b may be the same as described for control unit 23. This embodiment allows some changes of gear ratio even if one of the control units should malfunction.

Transmission control unit 15 may automatically control the operation of front transmission 8 and rear transmission 9 according to bicycle speed or some other parameter in a known manner instead of or in addition to the manual operation described. The teachings herein can be applied to any movable bicycle component. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An apparatus for controlling a movable bicycle device comprising:
    a power supply sensor that detects an abnormal power supply characteristic; and
    a control unit operatively coupled to the power supply sensor;
    wherein the control unit provides a first signal to command the bicycle device to move a nonzero distance in a first manner of movement when the power supply has a first characteristic; and
    wherein the control unit provides a second signal to command the bicycle device to move the nonzero distance in a different second manner of movement when the power supply has a second characteristic that is abnormal.

2. The apparatus according to claim 1 wherein the first signal commands the bicycle device to move a first distance in a selected time interval in response to the first signal, and wherein the second signal commands the bicycle device to move a different second distance in the same selected time interval in response to the second signal.

3. The apparatus according to claim 1 wherein the first signal commands the bicycle device to move in a continuous manner of movement in response to the first signal, and wherein the second signal commands the bicycle device to move in an intermittent manner of movement in response to the second signal.

4. The apparatus according to claim 3 wherein the first signal comprises a continuous signal, and wherein the second signal comprises an intermittent signal.

5. The apparatus according to claim 3 wherein the first signal comprises a multibit first digital signal, and wherein the second signal comprises a multibit second digital signal.

6. The apparatus according to claim 1 further comprising a position sensor that provides a position indicating signal that indicates a position of the bicycle device, and wherein the control unit is operatively coupled to the position sensor and provides the first signal and the second signal based at least in part on the position indicating signal.

7. The apparatus according to claim 1 wherein the first signal and the second signal are adapted to operate a bicycle transmission.

8. The apparatus according to claim 7 wherein the first signal and the second signal are adapted to operate a derailleur.

9. The apparatus according to claim 7 wherein the first signal and the second signal are adapted to operate a motor that moves the bicycle transmission.

10. The apparatus according to claim 1 wherein the abnormal power supply characteristic corresponds to an abnormal power supply voltage.

11. The apparatus according to claim 10 wherein the control unit provides the first signal when the power supply voltage is below a predetermined value, and wherein the control unit provides the second signal when the power supply voltage is above the predetermined value.

12. The apparatus according to claim 11 wherein the first signal commands the bicycle device to move a first distance in a selected time interval in response to the first signal, and wherein the second signal commands the bicycle device to move a different second distance in the same selected time interval in response to the second signal.

13. The apparatus according to claim 12 wherein the second distance is less than the first distance.

14. The apparatus according to claim 13 wherein the first signal and the second signal are adapted to operate a bicycle transmission.

15. The apparatus according to claim 14 wherein the first signal commands the bicycle device to move in a continuous manner of movement in response to the first signal, and wherein the second signal commands the bicycle device to move in an intermittent manner of movement in response to the second signal.

16. The apparatus according to claim 15 wherein the first signal comprises a multibit first digital signal, and wherein the second signal comprises a multibit second digital signal.

17. The apparatus according to claim 16 wherein the first signal and the second signal are adapted to operate a derailleur.

18. The apparatus according to claim 15 wherein the first signal and the second signal are adapted to operate a motor that moves the bicycle transmission.

19. The apparatus according to claim 18 wherein the first signal comprises a continuous signal, and wherein the second signal comprises an intermittent signal.

20. The apparatus according to claim 19 wherein the first signal and the second signal are adapted to operate a motor that moves a derailleur.

21. A method for controlling a movable bicycle device comprising the steps of:
    detecting an abnormal power supply characteristic;

providing a first signal by a control unit to command the bicycle device to move a nonzero distance in a first manner of movement when the power supply has a first characteristic; and providing a second signal by the control unit to command the bicycle device to move a nonzero distance in a different second manner of movement when the power supply has a second characteristic that is abnormal.

22. The apparatus according to claim 1 wherein the control unit commands the bicycle device to move the same nonzero distance in response to each of the first signal and the second signal.

23. An apparatus for a bicycle comprising:

an electrically-operated movable bicycle device;

a power supply sensor that detects an abnormal power supply characteristic; and a control unit operatively coupled to the power supply sensor and to the bicycle device;

wherein the control unit provides a first signal to command the bicycle device to move a nonzero distance in a first manner of movement when the power supply has a first characteristic;

wherein the bicycle device moves the nonzero distance in the first manner of movement in response to the first signal;

wherein the control unit provides a second signal to command the bicycle device to move a nonzero distance in a different second manner of movement when the power supply has a second characteristic that is abnormal; and wherein the bicycle device moves the nonzero distance in the second manner of movement in response to the second signal.

* * * * *